(12) United States Patent
Ye

(10) Patent No.: US 11,248,648 B2
(45) Date of Patent: Feb. 15, 2022

(54) ROTATABLE BALL JOINT AND UNIVERSAL BALL JOINT ASSEMBLY

(71) Applicant: PEGATRON CORPORATION, Taipei (TW)

(72) Inventor: Long-Sing Ye, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 205 days.

(21) Appl. No.: 16/785,461

(22) Filed: Feb. 7, 2020

(65) Prior Publication Data
US 2020/0300289 A1 Sep. 24, 2020

(30) Foreign Application Priority Data
Mar. 19, 2019 (TW) ................................. 108109331

(51) Int. Cl.
*F16C 11/06* (2006.01)

(52) U.S. Cl.
CPC ........ *F16C 11/0609* (2013.01); *F16C 11/069* (2013.01)

(58) Field of Classification Search
CPC . F16C 11/0671; F16C 11/0666; F16C 11/068; F16C 11/0619; F16C 11/0614; F16C 11/0623; F16C 11/0642; Y10T 403/31; Y10T 403/315; Y10T 403/32196; Y10T 403/32311; Y10T 403/32631
See application file for complete search history.

(56) References Cited

U.S. PATENT DOCUMENTS

| 2,527,787 | A | * | 10/1950 | Berger | ................ F16C 11/0628 403/39 |
| 4,222,680 | A |   | 9/1980  | Browning |  |
| 4,357,651 | A | * | 11/1982 | Mayer | .................. B60Q 1/0483 362/275 |
| 4,520,983 | A | * | 6/1985  | Templeman | .............. B60R 1/06 248/481 |

(Continued)

FOREIGN PATENT DOCUMENTS

| CN | 101336865 | 1/2009 |
| CN | 205298972 | 6/2016 |

Primary Examiner — Daniel J Wiley
(74) Attorney, Agent, or Firm — J.C. Patents

(57) ABSTRACT

A rotatable ball joint is provided. The rotatable ball joint is adapted to enable an object to be rotatably assembled on a foot stand, where the foot stand includes a fixed hole. The rotatable ball joint includes a friction part, a shapeshifting sphere, and an assembly part. The shapeshifting sphere is adapted to be compressed from a first state to a second state. A size of the shapeshifting sphere in the first state is greater than a size of the fixed hole, and a size of the shapeshifting sphere in the second state is less than the size of the fixed hole. The shapeshifting sphere is adapted to be disposed in the fixed hole. The shapeshifting sphere is connected to the assembly part. The object is adapted to be assembled on the assembly part. The friction part is configured on an outer surface of the shapeshifting sphere. When the shapeshifting sphere is disposed in the fixed hole, the friction part is in contact with an inner wall surface of the fixed hole to temporarily maintain the rotatable ball joint at a specific angle relative to the foot stand. A universal ball joint assembly is further provided.

10 Claims, 7 Drawing Sheets

(56) References Cited

U.S. PATENT DOCUMENTS

| | | | |
|---|---|---|---|
| 4,565,345 A * | 1/1986 | Templeman | B60R 1/06 |
| | | | 248/481 |
| 5,746,548 A * | 5/1998 | Crandall | F16C 11/0604 |
| | | | 248/481 |
| 2011/0033227 A1 | 2/2011 | Kwon | |

* cited by examiner

ROTATABLE BALL JOINT AND UNIVERSAL BALL JOINT ASSEMBLY

CROSS-REFERENCE TO RELATED APPLICATIONS

This Non-provisional application claims priority under 35 U.S.C. § 119(a) on Patent Application No(s). TW108109331 filed in Taiwan, Republic of China on Mar. 19, 2019, the entire contents of which are hereby incorporated by reference.

BACKGROUND

Technology Field

The present invention relates to a ball joint and a ball joint assembly, and in particular, to a rotatable ball joint and a universal ball joint assembly.

Description of Related Art

Generally, a foot stand of a common universal ball joint assembly includes a foot stand body, a universal ball joint that is configured in the foot stand body and can rotate relative to the foot stand body and a knob that pushes the universal ball joint against the foot stand body to temporarily fix the universal ball joint, which allows an object mounted on the foot stand to rotate and to be temporarily fixed at a specific angle. That is, in order to temporarily fix the universal ball joint at the specific angle, currently it is achieved mainly by adjusting the length of the knob screwed in the foot stand body to control the extent of the universal ball joint being pushed in the foot stand body and to control whether the universal ball joint is fixed or how much force is applied to rotate the universal ball joint. However, the foregoing structure has many elements, complex configuration and poor appearance.

SUMMARY

The present invention provides a rotatable ball joint and a universal ball joint assembly thereof with less quantity of elements and simple appearance.

The present invention provides a universal ball joint assembly which has the foregoing advantages.

The rotatable ball joint of the present invention is adapted to allow an object to be rotatably assembled on a foot stand, where the foot stand includes a fixed hole. The rotatable ball joint includes a friction part, a shapeshifting sphere, and an assembly part. The shapeshifting sphere is adapted to switch from a first state to a second state due to compression. A size of the shapeshifting sphere in the first state is greater than a size of the fixed hole, and a size of the shapeshifting sphere in the second state is less than the size of the fixed hole. The shapeshifting sphere is adapted to be disposed in the fixed hole. The assembly part is connected to the shapeshifting sphere. The object is adapted to be assembled on the assembly part. The friction part is configured on an outer surface of the shapeshifting sphere. When the shapeshifting sphere is disposed in the fixed hole, the friction part is in contact with an inner wall surface of the fixed hole to allow the rotatable ball join to temporarily maintain at a specific angle relative to the foot stand.

In an embodiment of the present invention, the shapeshifting sphere includes a plurality of flexible clamp claws, the flexible clamp claws form a hollow spherical space and the friction part is configured on the flexible clamp claws.

In an embodiment of the present invention, a fixing piece is further included to connect the shapeshifting sphere with the assembly part.

In an embodiment of the present invention, the shapeshifting sphere and the assembly part are integrally formed.

In an embodiment of the present invention, the friction part is made of rubber, silicone rubber, or foam.

The universal ball joint assembly of the present invention is adapted for holding an object. The universal ball joint assembly includes a foot stand and a rotatable ball joint. The foot stand includes a fixed hole. The rotatable ball joint is rotatably disposed in the foot stand. The rotatable ball joint includes a friction part, a shapeshifting sphere, and an assembly part. The shapeshifting sphere is adapted to switch from a first state to a second state due to compression. A size of the shapeshifting sphere in the first state is greater than a size of the fixed hole, and a size of the shapeshifting sphere in the second state is less than the size of the fixed hole. The shapeshifting sphere is adapted to be disposed in the fixed hole. The assembly part is connected to the shapeshifting sphere. The object is adapted to be assembled on the assembly part. The friction part is configured on an outer surface of the shapeshifting sphere. When the shapeshifting sphere is disposed in the fixed hole, the friction part is in contact with an inner wall surface of the fixed hole to allow the rotatable ball join to temporarily maintain at a specific angle relative to the foot stand.

In an embodiment of the present invention, the foot stand includes a lower base, an upper base, a first magnetic piece and a second magnetic piece corresponding to the first magnetic piece, where the first magnetic piece is configured on the upper base, the second magnetic piece is configured on the lower base, and the upper base is detachably assembled on the lower base with the first magnetic piece and the second magnetic piece.

In an embodiment of the present invention, the foot stand further includes a locking piece, where the lower base is fixed on a wall surface by the locking piece.

In an embodiment of the present invention, the shapeshifting sphere includes a plurality of flexible clamp claws, the flexible clamp claws form a hollow spherical space and the friction part is configured on the flexible clamp claws.

In an embodiment of the present invention, a fixing piece is further included to connect the shapeshifting sphere with the assembly part.

In an embodiment of the present invention, the shapeshifting sphere and the assembly part are integrally formed.

In an embodiment of the present invention, a material of the friction part includes rubber, silicone rubber, or foam.

Based on the above, in the universal ball joint assembly in the present invention, the shapeshifting sphere, which is originally bigger than the fixed hole may be compressed into the size smaller than the fixed hole and put into the fixed hole. The shapeshifting sphere located in the fixed hole is restored back to the original size and remains in the fixed hole without falling out. Therefore, the rotatable ball joint may be rotatably disposed in the fixed hole of the foot stand through the shapeshifting sphere. In addition, the friction part configured on the outer surface of the shapeshifting sphere may be in contact with the inner wall surface of the fixed hole to provide friction between the friction part and the inner wall surface of the fixed hole. Therefore, apart from rotating relative to the foot stand, the object can be temporarily fixed at the specific angle through the friction between the friction part and the inner wall surface of the hole.

To make the above features and advantages in the present invention more obvious and easy to understand, the following embodiment is given and illustrated in detail with accompanying drawings.

DETAILED DESCRIPTION

Figure 1:
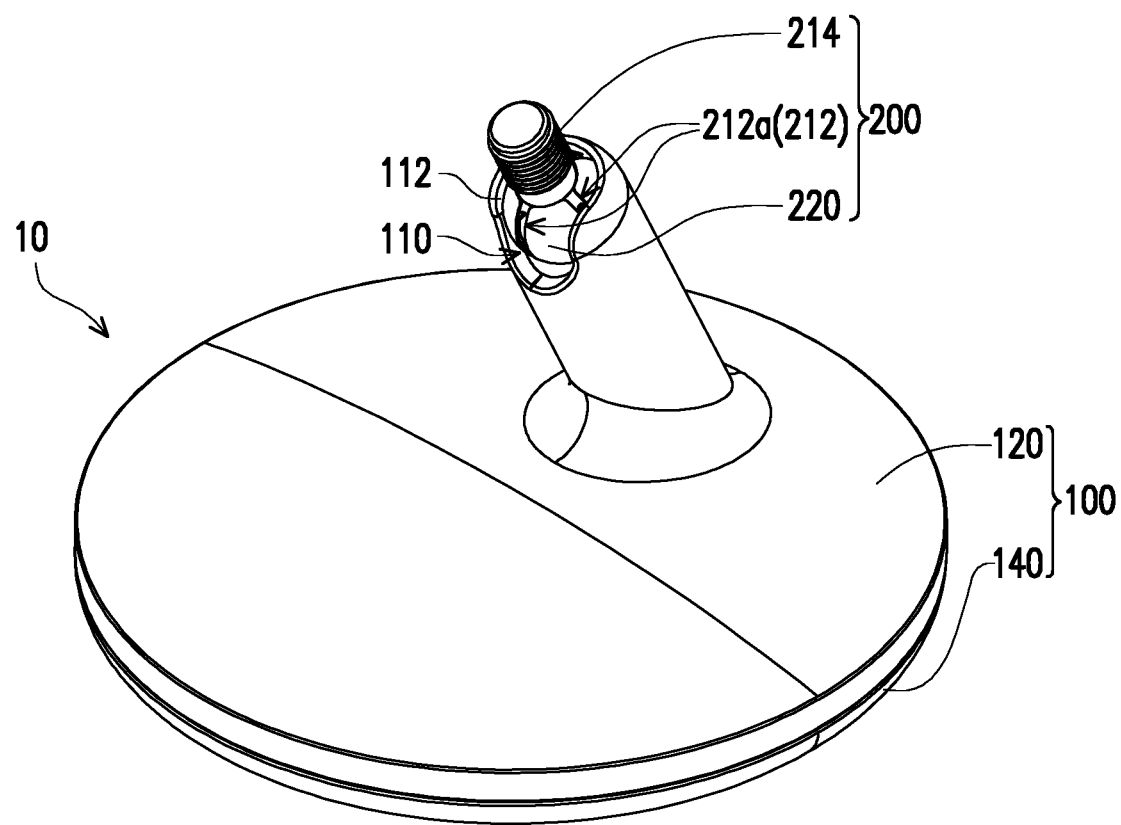
FIG. 1 is a schematic three-dimensional view of a universal ball joint assembly according to an embodiment of the present invention.
Figure 2:
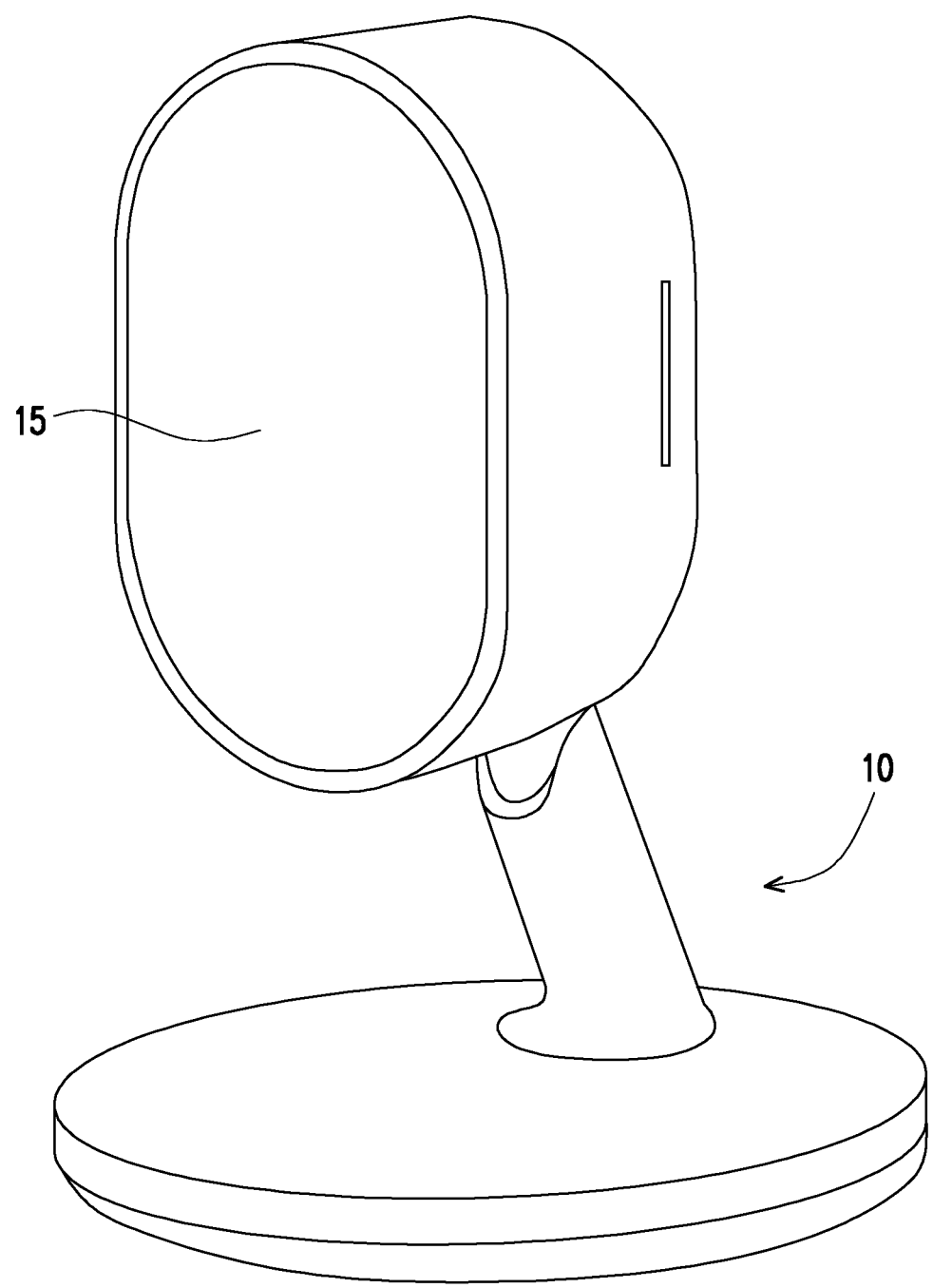
FIG. 2 is a schematic three-dimensional view of an object assembled on the universal ball joint assembly of FIG. 1.

FIG. 1 is a schematic three-dimensional view of a universal ball joint assembly according to an embodiment of the present invention. FIG. 2 is a schematic three-dimensional view of an object assembled on the universal ball joint assembly of FIG. 1. Referring to FIG. 1 and FIG. 2, in this embodiment, an object 15 (as shown in FIG. 2) may be rotatably disposed on a universal ball joint assembly 10, and the universal ball joint assembly 10 includes a foot stand 100 and a rotatable ball joint 200. To be specific, the object 15 is assembled on the rotatable ball joint 200, the rotatable ball joint 200 may be rotatably disposed in the foot stand 100, and the object 15 can temporarily maintains at a specific angle relative to the foot stand 100 by the rotatable ball joint 200.

It should be noted that, the object 15 shown in FIG. 2 is taken as an example so the present invention does not limit the type, form and size of the object 15 hereto. Therefore, any object, such as a camera, a clock, a mirror, a mobile phone holder or a camera holder, which is required to be temporarily fixed at a specific angle relative to the foot stand 100 and able to be rotated to another angle by force, may be applied to the universal ball joint assembly in the present invention. Therefore, the universal ball joint assembly may have other appropriate designs according to practical requirements, and the present invention is not limited thereto. It should be noted that a structure of the object 15 is omitted in FIG. 1, and FIG. 3 to FIG. 7.

Figure 3:
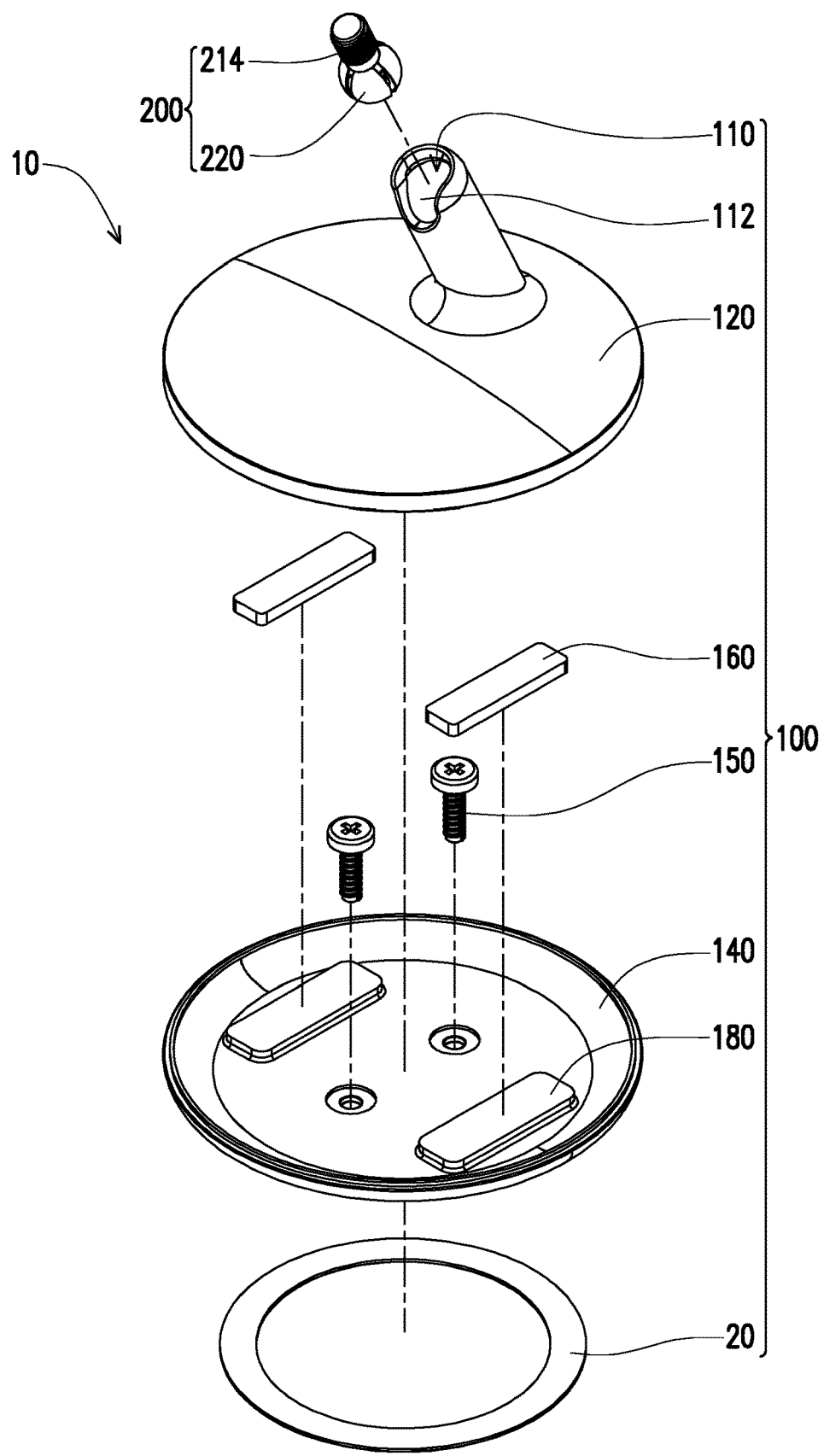
FIG. 3 is a schematic exploded view of the universal ball joint assembly of FIG. 1.
Figure 4:
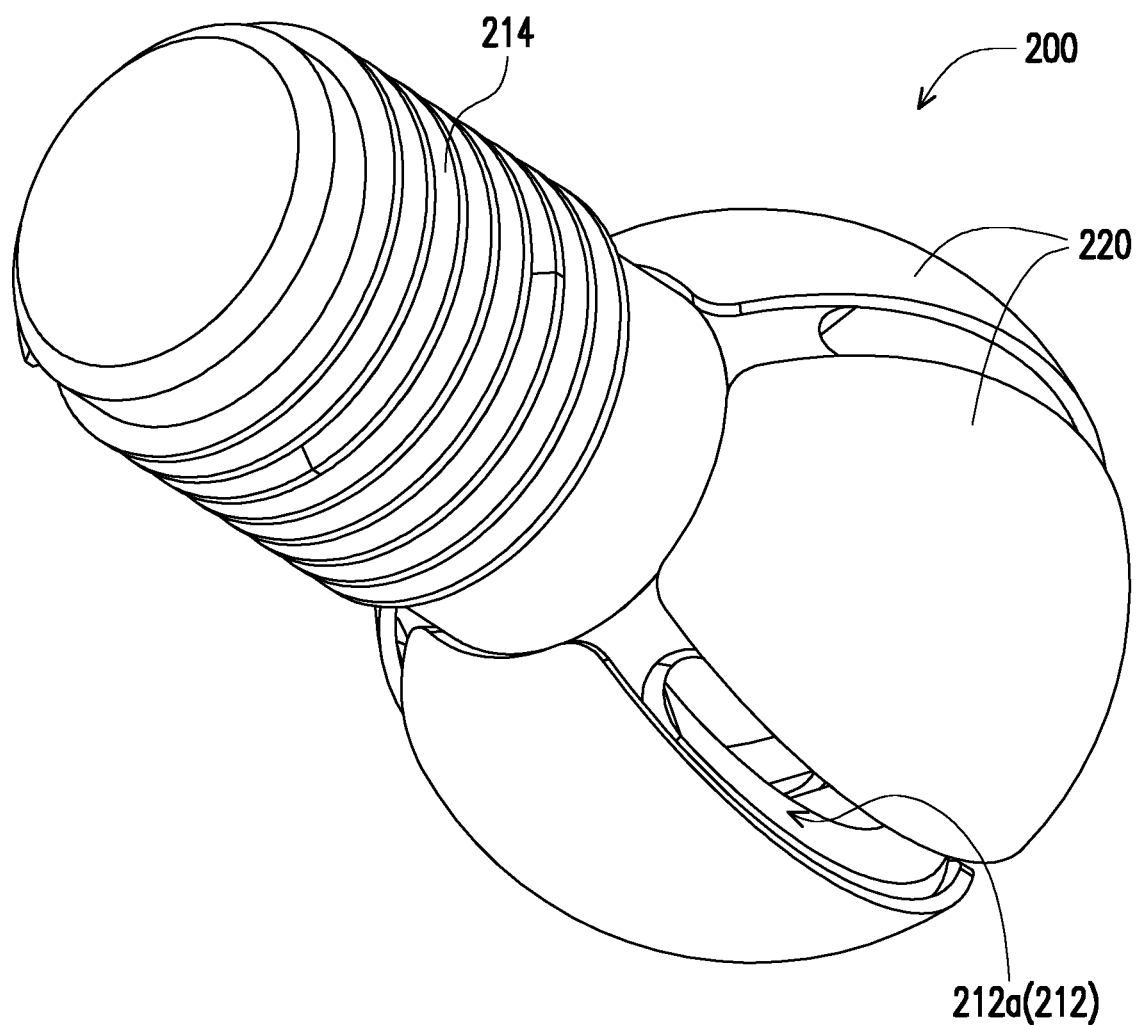
FIG. 4 is a schematic three-dimensional view of a rotatable ball joint of the universal ball joint assembly of FIG. 1.
Figure 5:
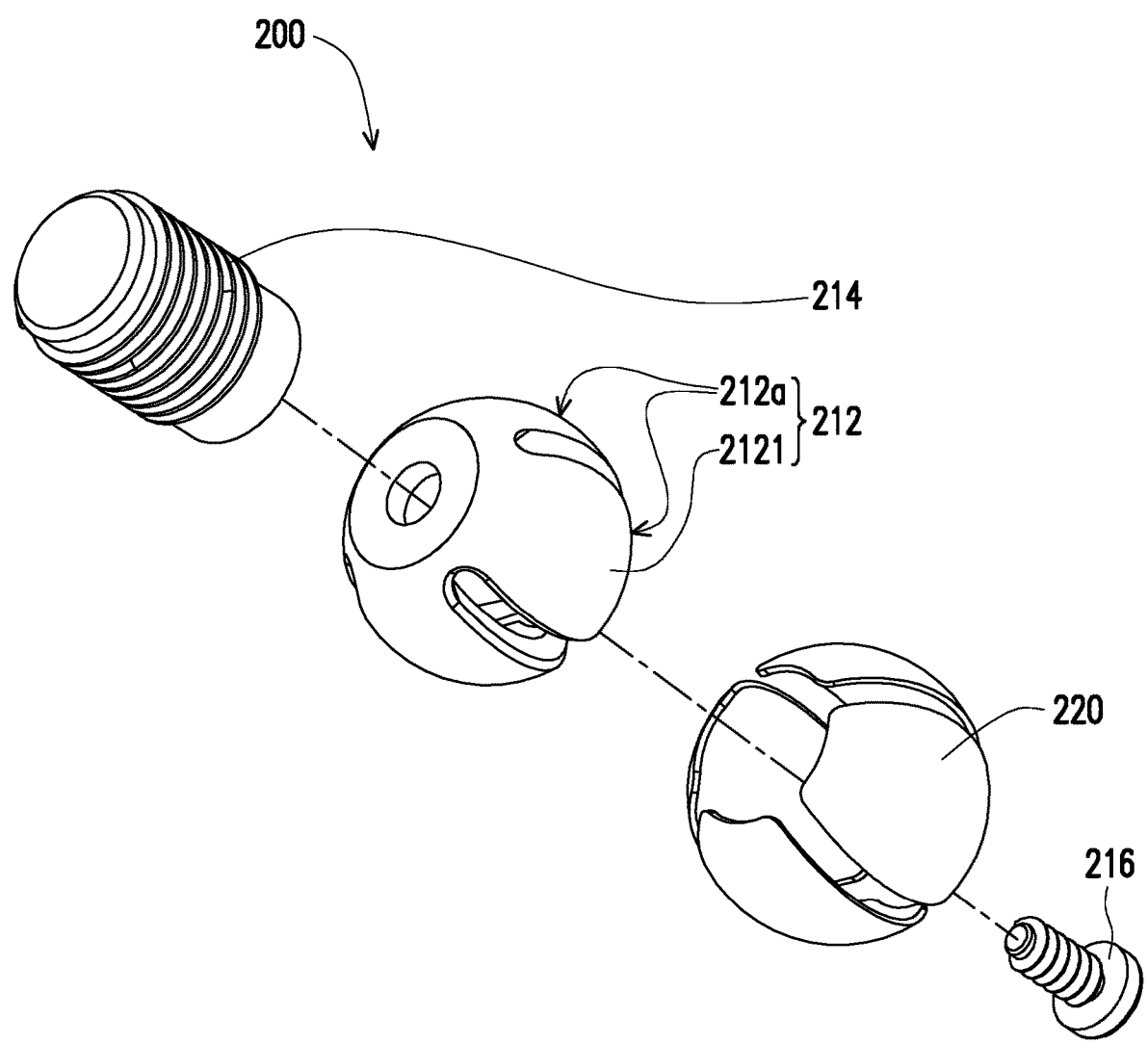
FIG. 5 is a schematic exploded view of the rotatable ball joint of FIG. 3.
Figure 6:
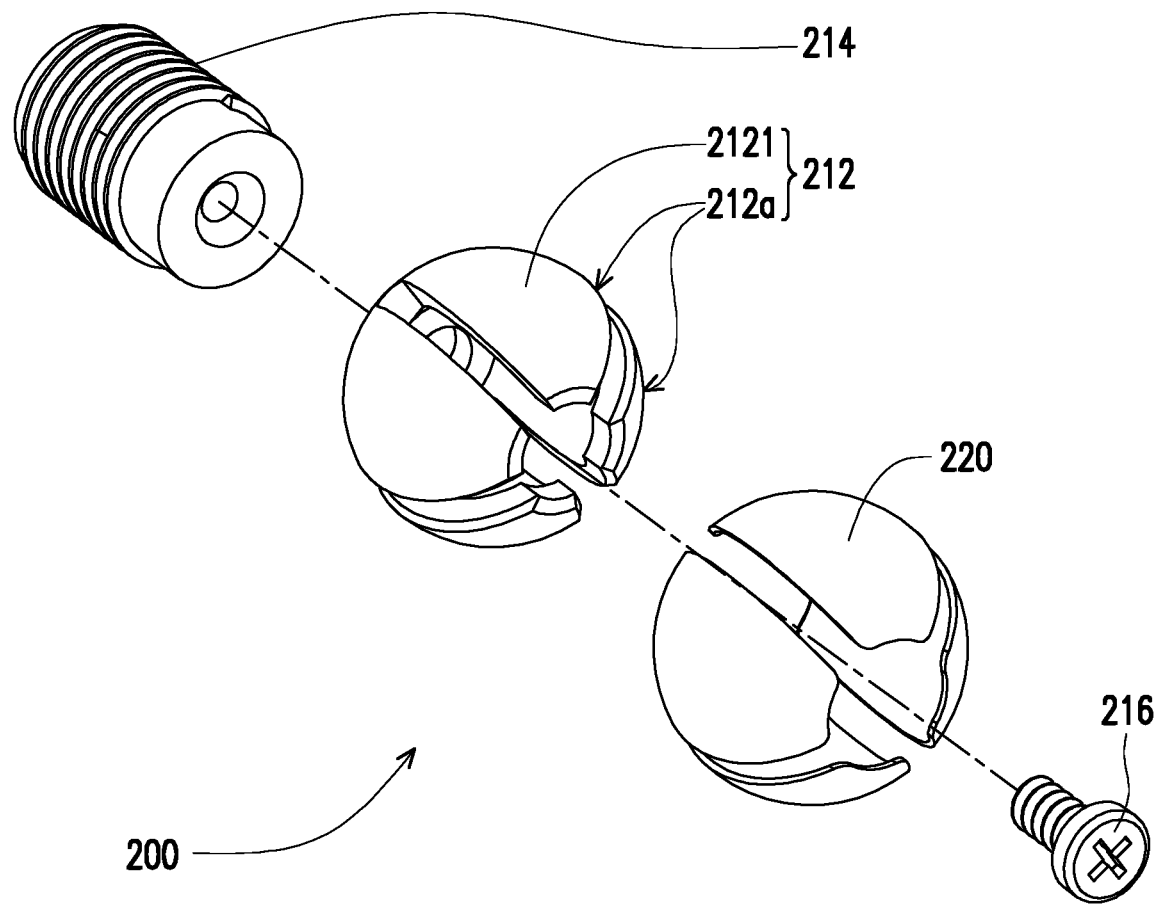
FIG. 6 is a schematic exploded view of the rotatable ball joint of FIG. 3 at another angle of view.

FIG. 3 is a schematic exploded view of the universal ball joint assembly of FIG. 1; Referring to FIG. 1 to FIG. 3, in this embodiment, the foot stand 100 includes a fixed hole 110. The rotatable ball joint 200 is rotatably disposed in the fixed hole 110 of the foot stand 100. FIG. 4 is a schematic three-dimensional view of a rotatable ball joint of the universal ball joint assembly of FIG. 1. FIG. 5 is a schematic exploded view of the rotatable ball joint of FIG. 3. FIG. 6 is a schematic exploded view of the rotatable ball joint of FIG. 3 at another angle of view. Referring to FIG. 4 to FIG. 6, in this embodiment, the rotatable ball joint 200 includes a friction part 220, a shapeshifting sphere 212, and an assembly part 214, which is connected to the shapeshifting sphere 212, and the object 15 is adapted to be assembled on the assembly part 214.

In this embodiment, as shown in FIG. 4 and FIG. 5, the rotatable ball joint 200 optionally includes a fixing piece 216 that connects the shapeshifting sphere 212 with the assembly part 214. Moreover, the fixing piece 216 in this embodiment is, for example, a screw and connects the shapeshifting sphere 212 with the assembly part 214 in a screwing manner. In another embodiment, the shapeshifting sphere 212 and the assembly part 214 may be connected in a gluing manner, in a spot welding manner, in a clamping manner, in a riveting manner or other suitable connection manners. That is, the fixing piece 216 may be glue, solder, a rivet, and the like. In addition, apart from the foregoing connection manners, the shapeshifting sphere 212 and the assembly part 214 may also be integrally formed in yet another embodiment, and the present invention does not limit the connection manner and form of the shapeshifting sphere 212 and the assembly part 214 thereto.

In this embodiment, the shapeshifting sphere 212 can switch from a first state to a second state due to compression. A size of the shapeshifting sphere 212 in the first state is greater than a size of the fixed hole 110, and the size of the shapeshifting sphere 212 in the second state is less than the size of the fixed hole 110. Therefore, the shapeshifting sphere 212 in the second state may enter the fixed hole 110 and restore to the first state without extruding the fixed hole 110.

Furthermore, as shown in FIG. 5 and FIG. 6, in this embodiment, the shapeshifting sphere 212 optionally includes a plurality of flexible clamp claws 212a and the flexible clamp claws 212a jointly form a hollow spherical space. In this embodiment, when the flexible clamp claws 212a naturally open and form the hollow spherical space, the shapeshifting sphere 212 is in the first state. When the flexible clamp claws 212a are compressed from the outside the shapeshifting sphere 212 switches to the second state.

Figure 7:
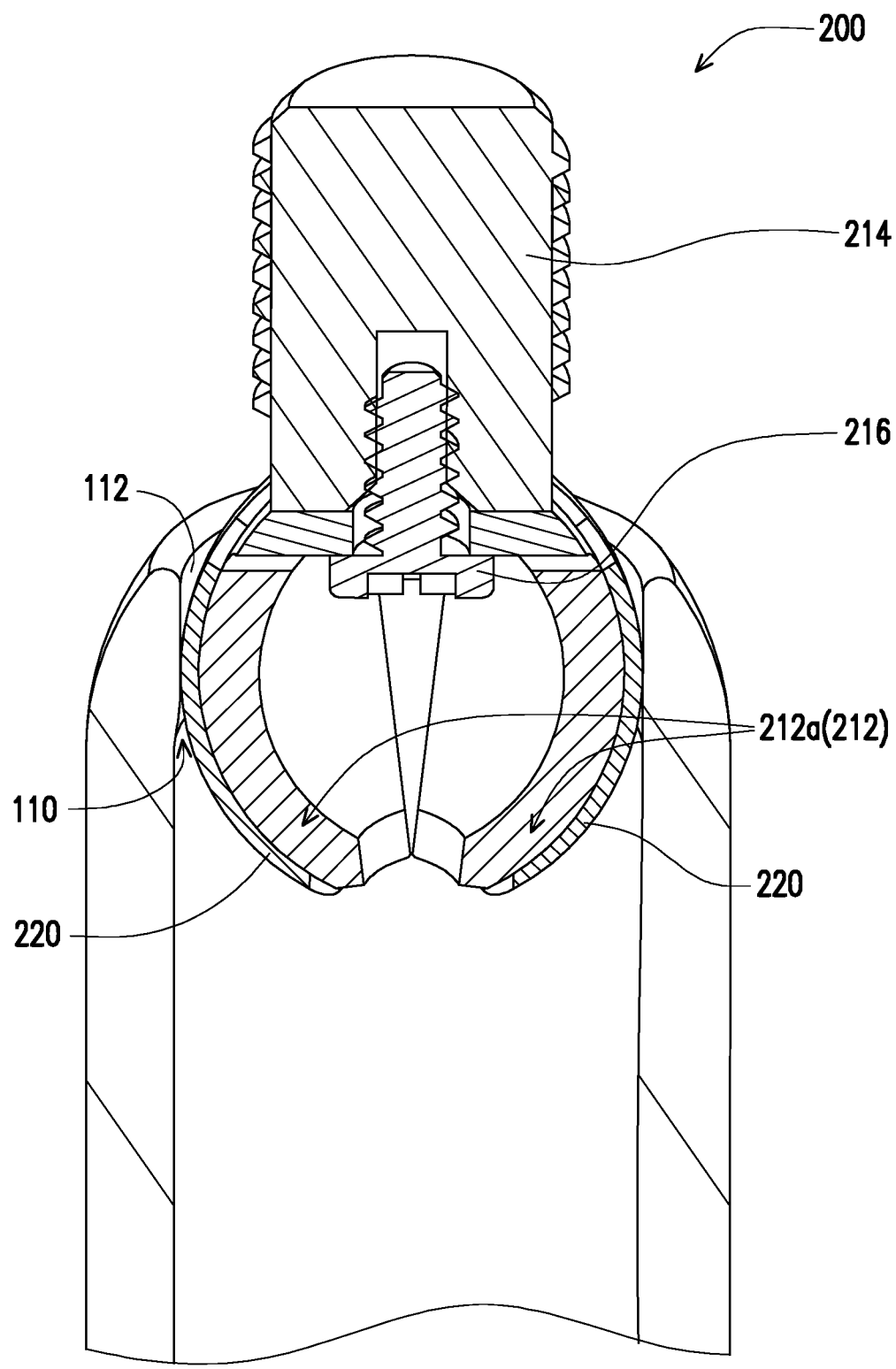
FIG. 7 is a schematic cross-sectional view of the partial universal ball joint assembly of FIG. 1.

FIG. 7 is a schematic cross-sectional view of the partial universal ball joint assembly of FIG. 1. Referring to FIG. 7, based on the design, when a user wants to mount the rotatable ball joint 200 on the foot stand 100, the user only needs to apply a force to the shapeshifting sphere 212 first to compress the flexible clamp claws 212a of the shapeshifting sphere 212 to the second state, and then put the flexible clamp claws 212a of the shapeshifting sphere 212 into the fixed hole 110 of the foot stand 100. At this moment, without any external compression, the flexible clamp claws 212a of the shapeshifting sphere 212 return to the original position and are adapted to restore back to the first state. In this situation, because the size of the shapeshifting sphere 212 is greater than the size of the fixed hole 110 the shapeshifting sphere 212 may be rotatably disposed in the fixed hole 110 without falling out.

It should be noted that, in this embodiment, a quantity of the flexible clamp claws 212a is shown, for example, as four, but the present invention does not limit the quantity of the flexible clamp claws 212a. Moreover, a design of the flexible clamp claws 212a is merely an example. Definitely, in another embodiment, the shapeshifting sphere 212 does not have to adopt the design of the flexible clamp claws 212a, or even does not need the hollow spherical space formed. In other words, the shapeshifting sphere 212 may also be, for example, a solid construction that is shapeshifting and compressible as long as it is convenient to rotationally dispose the shapeshifting sphere 212 in the fixed hole 110 and the present invention is not limited thereto.

In addition, in this embodiment, the friction part 220 is disposed on an outer surface 2121 of the shapeshifting sphere 212, and almost covers the entire outer surface 2121 of the shapeshifting sphere 212, but is not limited thereto. In another embodiment, the friction part 220 may also cover only a portion of the outer surface 2121 of the shapeshifting sphere 212.

Specifically, as shown in FIG. 5 and FIG. 6, the friction part 220 in this embodiment is disposed on the flexible clamp claws 212a. The friction part 220 in this embodiment, for example, is in a sheet form and adhered to the flexible clamp claws 212a. Therefore, when the flexible clamp claws 212a of the shapeshifting sphere 212 are disposed in the fixed hole 110, the friction part 220 is in contact with an inner wall surface 112 of the fixed hole 110 to generate friction. Therefore, by the friction between the friction part 220 and the inner wall surface 112, the rotatable ball joint 200 temporarily maintains at the specific angle relative to the foot stand 100.

In this embodiment, the friction part 220, for example, is a composite of rubber and Teflon, and has low friction and compressibility. Definitely, in another embodiment, the friction part 220 may also be made of, for example, silicon rubber, foam or other suitable materials according to practical requirements. The material of the friction part 220 is not limited thereto. In addition, in another embodiment, the friction part 220 may not be in a sheet form, and may not be adhered. For example, the friction part 220 and the shapeshifting sphere 212 may also be made in an integrally formed manner. In addition, in an embodiment where the flexible clamp claw 212a is not adopted (which is not shown), a design of the friction part 220 may also vary according to the practical requirements. In other words, in another embodiment, the friction part 220 may also have other suitable designs, and the present invention does not limit the shape, form and quantity of the friction part 220.

Base on this design, when the object 15 (as shown in FIG. 2) is mounted on the assembly part 214, the shapeshifting sphere 212 is rotatably disposed in the fixed hole 110 of the foot stand 100, and the shapeshifting sphere 212 can be temporarily fixed at the specific angle by the friction between the friction part 220 disposed on the outer surface 2121 and the inner wall surface 112 of the fixed hole 110. Therefore, the object 15 may be rotatably disposed on the foot stand 100 by the rotatable ball joint 200 and temporarily fixed at the specific angle relative to the foot stand 100.

The object 15 is able to rotate as long as a force applied overcomes the maximum static friction between the friction part 220 and the inner wall surface 112 of the fixed hole 110, and the rotatable ball joint 200 is able to rotate relative to the foot stand 100.

It should be noted that, in an embodiment that is not shown, the friction between the friction part 220 and the inner wall surface 112 of the fixed hole 110 may also be adjusted by changing the thickness and material of the friction part 220 so that a plurality of different hand textures is provided between the shapeshifting sphere 212 and the foot stand 100. Definitely, the present invention is not limited thereto.

The structure of the foot stand 100 is described in detail below. Still referring back to FIG. 3, in this embodiment, the foot stand 100 includes a lower base 140, an upper base 120, at least one first magnetic piece 160 and at least one second magnetic piece 180 corresponding to the first magnetic piece 160. Specifically, the first magnetic piece 160 is disposed on the upper base 120 and the second magnetic piece 180 is disposed on the lower base 140. The upper base 120 is detachably assembled on the lower base 140 by the first magnetic piece 160 and the second magnetic piece 180. Definitely, in another embodiment, the upper base 120 may not be detachably assembled on the lower base 140 by the first magnetic piece 160 and the second magnetic piece 180, and alternatively other non-magnetic connection manners, such as a clamping manner, may also be used. The present invention is not limited thereto.

In addition, a foot pad 20 is further optionally provided under the lower base 140 in this embodiment. When the universal ball joint assembly 10 in this embodiment is placed, for example, on a table, a buffering effect and the friction between the lower base 140 and the table can be provided so that the foot stand 100 can be placed more securely and firmly on the table. Definitely, the present invention is not limited thereto.

It should be noted that, in this embodiment, the first magnetic piece 160 is a magnet, such as a neodymium iron boron strong magnet, but is not limited thereto. The second magnetic piece 180 is a non-magnetic metal piece. Definitely, in another embodiment, the first magnetic piece 160 and the second magnetic piece 180 may also be two magnets that have opposite magnetic polarities and attract each other. Alternatively, the first magnetic piece 160 is the non-magnetic metal piece and the second magnetic piece 180 is the magnet. The present invention does not limit the quantity, material and form of the first magnetic piece 160 and the second magnetic piece 180 as long as the upper base 120 can be detachably assembled on the lower base 140 firmly.

Referring to FIG. 2 and FIG. 3, in this embodiment, the foot stand 100 further includes a locking piece 150, and the locking piece 150 is optionally used to fix the lower base 140 on a wall surface (which is not shown). Therefore, for example, when the user wants to place the universal ball joint assembly 10 and the object 15 on the wall surface, for example, a vertical wall, the user may first fasten the lower base 140 on the wall by the locking piece 150 alone, and then assemble the upper base 120 on the lower base 140. In this way, in an embodiment that is not shown, the user may dispose the universal ball joint assembly 10 and the object 15 on the wall. Definitely, in another embodiment, the universal ball joint assembly 10 may be placed or fixed at any suitable places according to the practical requirements, and the present invention does not limit the placement manner of the universal ball joint assembly 10.

It should be noted that, the locking piece 150, for example, two screws as shown in this embodiment, fastens the lower base 140 on an appropriate wall surface in a screwing manner. Definitely, in another embodiment, other appropriate fixing manners such as adhesion and magnetic may also be used, and the present invention is not limited thereto.

In addition, when the user wants to place the universal ball joint assembly 10 and the object 15 on the table, for example, in a direction shown in FIG. 2, the user only needs to assemble the upper base 120 and the lower base 140 by using the first magnetic piece 160 and the second magnetic piece 180, and therefore the locking piece 150 is not needed. That is, in this embodiment, the locking piece 150 in FIG. 3 is an optional component according to practical requirements.

To sum up, in the universal ball joint assembly of the present invention, the shapeshifting sphere with the original size greater than the size of the fixed hole may be compressed into the size less than the size of the fixed hole and put into the fixed hole, and the shapeshifting sphere located in the fixed hole is restored to the original size to remain in the fixed hole without falling out. Therefore, the rotatable ball joint may be rotatably disposed in the fixed hole of the foot stand through the shapeshifting sphere. In addition, the friction part configured on the outer surface of the shapeshifting sphere may be in contact with the inner wall surface of the fixed hole to provide friction between the friction part and the inner wall surface of the fixed hole. Therefore, apart from rotating the relative to the foot stand, the object can be temporarily fixed at the specific angle because of the friction between the friction part and the inner wall surface of the hole. Furthermore, the design of the friction part and the shapeshifting sphere without a complicated lock torque structure makes the structure more simple, space saving and aesthetic. In addition, the foot stand of the present invention may be fastened on the wall surface, and a locking piece is hidden in the upper base of the foot stand and the lower base, which makes the appearance of the universal ball joint assembly in the present invention simple.

Although the present invention has been disclosed as mentioned in the embodiment, it is not intended to limit the present invention. Any person with general knowledge in the technical field of the present invention can make some changes and modifications without deviating from the spirit and scope of the present invention, so the protection scope of the present invention shall be subject to the definition of the claims attached hereto.

What is claimed is:

1. A rotatable ball joint, adapted to allow an object to be rotatably assembled on a foot stand, wherein the foot stand comprises a fixed hole and the rotatable ball joint comprises:
    a shapeshifting sphere, wherein the shapeshifting sphere is adapted to switch from a first state to a second state due to compression, a size of the shapeshifting sphere in the first state is greater than a size of the fixed hole, the size of the shapeshifting sphere in the second state is less than the size of the fixed hole, and the shapeshifting sphere is adapted to be disposed in the fixed hole of the foot stand;
    an assembly part, connected to the shapeshifting sphere, wherein the object is adapted to be assembled on the assembly part; and
    a friction part, configured on an outer surface of the shapeshifting sphere, wherein when the shapeshifting sphere is disposed in the fixed hole of the foot stand, the friction part is in contact with an inner wall surface of the fixed hole and generates friction, and the friction allows the rotatable ball joint to temporarily maintain at a specific angle relative to the rotatable ball joint;
    wherein the shapeshifting sphere comprises a plurality of flexible clamp claws, the flexible clamp claws jointly form a hollow spherical space, and the friction part is configured on the flexible clamp claws.

2. The rotatable ball joint according to claim 1, further comprising a fixing piece, connecting the shapeshifting sphere with the assembly part.

3. The rotatable ball joint according to claim 1, wherein the shapeshifting sphere and the assembly part are integrally formed.

4. The rotatable ball joint according to claim 1, wherein the friction part is made of rubber, silicone rubber, or foam.

5. A universal ball joint assembly, adapted for holding an object, comprising:
    a foot stand, comprising a fixed hole; and
    a rotatable ball joint, rotatably disposed in the foot stand, the rotatable ball joint comprising:
        a shapeshifting sphere, wherein the shapeshifting sphere is adapted to switch from a first state to a second state due to compression, a size of the shapeshifting sphere in the first state is greater than a size of the fixed hole, the size of the shapeshifting sphere in the second state is less than the size of the fixed hole, and the shapeshifting sphere is disposed in the fixed hole of the foot stand;
        an assembly part, connected to the shapeshifting sphere, wherein the object is adapted to be assembled on the assembly part; and
        a friction part, configured on an outer surface of the shapeshifting sphere, wherein the friction part is in contact with an inner wall surface of the fixed hole to allow the rotatable ball joint to temporarily maintain at a specific angle relative to the foot stand;
        wherein the shapeshifting sphere comprises a plurality of flexible clamp claws, the plurality of the flexible clamp claws jointly forms a hollow spherical space, and the friction part is configured on the flexible clamp claws.

6. The universal ball joint assembly according to claim 5, wherein the foot stand comprises a lower base, an upper base, a first magnetic piece and a second magnetic piece corresponding to the first magnetic piece, wherein the first magnetic piece is configured on the upper base, the second magnetic piece is configured on the lower base, and the upper base is detachably assembled on the lower base with the first magnetic piece and the second magnetic piece.

7. The universal ball joint assembly according to claim 6, wherein the foot stand further comprises a locking piece and the lower base is fixed on a wall surface by the locking piece.

8. The universal ball joint assembly according to claim 5, further comprising a fixing piece connecting the shapeshifting sphere with the assembly part.

9. The universal ball joint assembly according to claim 5, wherein the shapeshifting sphere and the assembly part are integrally formed.

10. The universal ball joint assembly according to claim 5, wherein the friction part is made of rubber, silicone rubber, or foam.

* * * * *